(12) United States Patent  
Dent et al.

(10) Patent No.: US 8,102,950 B2
(45) Date of Patent: Jan. 24, 2012

(54) METHOD AND APPARATUS FOR EFFICIENT MULTI-SYMBOL DETECTION

(75) Inventors: Paul Wilkinson Dent, Pittsboro, NC (US); Gregory E. Bottomley, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 971 days.

(21) Appl. No.: 12/058,082

(22) Filed: Mar. 28, 2008

(65) Prior Publication Data

US 2009/0213922 A1 Aug. 27, 2009

Related U.S. Application Data

(63) Continuation-in-part of application No. 12/035,846, filed on Feb. 22, 2008.

(51) Int. Cl.
*H04L 27/06* (2006.01)
(52) U.S. Cl. .................... 375/340; 375/262; 714/786
(58) Field of Classification Search ............ 375/340
See application file for complete search history.

(56) References Cited

U.S. PATENT DOCUMENTS

| | | | |
|---|---|---|---|
| 6,570,910 B1 * | 5/2003 | Bottomley et al. ........... 375/148 |
| 6,925,127 B1 | 8/2005 | Dent | |
| 6,963,532 B1 | 11/2005 | Dent | |
| 2003/0086366 A1 * | 5/2003 | Branlund et al. ............ 370/208 |
| 2005/0050432 A1 * | 3/2005 | Chen et al. .................... 714/776 |
| 2005/0180492 A1 * | 8/2005 | Dent ............................ 375/144 |
| 2005/0201447 A1 | 9/2005 | Cairns et al. | |
| 2005/0201478 A1 | 9/2005 | Claussen et al. | |
| 2006/0013168 A1 * | 1/2006 | Agrawal et al. .............. 370/335 |
| 2006/0063505 A1 * | 3/2006 | Cairns .......................... 455/302 |
| 2006/0088119 A1 * | 4/2006 | Fu et al. ........................ 375/265 |
| 2007/0115800 A1 * | 5/2007 | Fonseka et al. .............. 370/208 |
| 2008/0219371 A1 * | 9/2008 | Hong et al. ................... 375/260 |

(Continued)

FOREIGN PATENT DOCUMENTS

EP 1331777 A1 7/2003
(Continued)

OTHER PUBLICATIONS

Balakrishnan, J. et al. "Time-Reversal Diversity in Decision Feedback Equalization." Proc. Allerton Conf. on Communication, Control and Computing. Monticello, IL, USA, Oct. 2000.

(Continued)

*Primary Examiner* — David C. Payne
*Assistant Examiner* — Erin File
(74) *Attorney, Agent, or Firm* — Coats & Bennett, P.L.L.C.

(57) ABSTRACT

Where two or more multi-valued digital data symbols are modulated so that they overlap after passing through a channel, forming a combined signal, a receiver receives the combined signal and forms detection statistics to attempt to recover the symbols. Where forming detection statistics does not completely separate the symbols, each statistic comprises a different mix of the symbols. A receiver determines the symbols which, when mixed in the same way, reproduce or explain the statistics most closely. For example, the receiver hypothesizes all but one of the symbols and subtracts the effect of the hypothesized symbols from the mixed statistics. The remainders are combined and quantized to the nearest value of the remaining symbol. For each hypothesis, the remaining symbol is determined. A metric is then computed for each symbol hypothesis including the so-determined remaining symbol, and the symbol set producing the best metric is chosen as the decoded symbols.

27 Claims, 6 Drawing Sheets

U.S. PATENT DOCUMENTS

| | | | |
|---|---|---|---|
| 2008/0232440 A1* | 9/2008 | Yousef et al. | 375/148 |
| 2008/0267164 A1* | 10/2008 | D'Alessandro | 370/350 |
| 2009/0059859 A1* | 3/2009 | Kuze et al. | 370/329 |
| 2009/0060063 A1* | 3/2009 | Guey | 375/260 |

FOREIGN PATENT DOCUMENTS

| | | |
|---|---|---|
| EP | 1605600 A1 | 12/2005 |
| WO | 02/080480 A1 | 10/2002 |
| WO | 2005/096517 A1 | 10/2005 |

OTHER PUBLICATIONS

Co-pending U.S. Appl. No. 11/566,756, filed Dec. 5, 2006.
Co-pending U.S. Appl. No. 11/935,840, filed Nov. 6, 2007.
Choi, J. et al. "Receivers with Chip-Level Decision Feedback Equalizer for CDMA Downlink Channels." IEEE Transactions on Wireless Communications, vol. 3, No. 1, Jan. 2004, pp. 300-314.
Duel-Hallen, A. "Decorrelating Decision-Feedback Multiuser Detector for Synchronous Code-Division Multiple-Access Channel." IEEE Transactions on Communications, vol. 41, No. 2, Feb. 1993, pp. 285-290.
Grant, S. J. et al. "Generalized RAKE Receivers for MIMO Systems." 2003 IEEE 58th Vehicular Technology Conference, vol. 1, Oct. 6-9, 2003, pp. 424-428.
Klein, A. et al. "Zero Forcing and Minimum Mean-Square-Error Equalization for Multiuser Detection in Code-Division Multiple-Access Channels." IEEE Transactions on Vehicular Techonology, vol. 45, No. 2, May 1996, pp. 276-287.
Mailaender, L. "Linear MIMO Equalization for CDMA Downlink Signals with Code Reuse." IEEE Transactions on Wireless Communication, vol. 4, No. 5, Sep. 2005, pp. 2423-2434.
Nelson, J. K. et al. "BAD: Bidirectional Arbitrated Decision-Feedback Equalization." IEEE Transactions on Communications, vol. 53, No. 2, Feb. 2005, pp. 214-218.
Tang, X. et al. "Contradictory Block Arbitration for Bi-directional Decision Feedback Equalizers." Proc. IEEE Globecom, Nov. 17-21, 2002, pp. 283-286.
Varanasi, M. K. "Parallel Group Detection for Synchronous CDMA Communication Over Frequency-Selective Rayleigh Fading Channels." IEEE Transactions on Information Theory, vol. 42, No. 1, Jan. 1996, pp. 116-128.
Xie, Z. et al. "A Family of Suboptimum Detectors for Coherent Multiuser Communications." IEEE Journal on Selected Areas in Communications, vol. 8, No. 4, May 1990, pp. 683-690.
Williamson, D. et al. "Block Decision Feedback Equalization." IEEE Transactions on Communications, vol. 40, No. 2, Feb. 1992, pp. 255-264.
Bottomley, G. et al. "A Generalized RAKE Receiver for Interference Suppression." IEEE Journal on Selected Areas in Communications, vol. 18, No. 8, Aug. 2000, pp. 1536-1545.
Wang, Y.P. E. et al. "DS-CDMA Downlink System Capacity Enhancement through Interference Suppression." IEEE Transactions on Wireless Communications, vol. 5, No. 7, Jul. 2006, pp. 1767-1774.
Oh, H.-S. et al. "Bidirectional Equalizer Arbitrated by Viterbi Decoder Path Metrics." IEEE Transactions on Consumer Electronics, vol. 53, Iss. 1, Feb. 2007, pp. 60-64.
Hochwald, B. M. et al. "Achieving Near-Capacity on a Multiple-Antenna Channel." IEEE Transactions on Communications, vol. 51, No. 3, Mar. 2003, pp. 389-399.
Eyuboglu, M. V. et al. "Reduced-State Sequence Estimation with Set Partitioning and Decision Feedback." IEEE Transactions on Communications, vol. 36, No. 1, Jan. 1988, pp. 13-20.
Bengough, P. A. et al. "Sorting-Based VLSI Architectures for the M-algorithm and T-algorithm Trellis Decoders." IEEE Transactions on Communications, vol. 43, No. 2/3/4, Feb./Mar./Apr. 1995, pp. 514-522.
Bottomley, "Block Equalization and Generalized MLSE Arbitration for the HSPA WCDMA Uplink," Vehicular Technology Conference, Sep. 21, 2008, pp. 1-5, IEEE, Piscataway, NJ, US.
Hafeez et al., "Adaptive Joint Detection of Cochannel Signals for TDMA Handsets," IEEE Transactions on Communications, Oct. 2004, pp. 1722-1732, vol. 52, No. 10, IEEE, Piscataway, NJ, US.
Smee et al., "Adaptive Space-Time Feedforward/Feedback Detection for High Data Rate CDMA in Frequency-Selective Fading," IEEE Transactions on Communications, Feb. 2001, pp. 317-328, vol. 49, No. 2, IEEE, Piscataway, NJ, US.
Smee et al., "Design Issues in Decision Feedback MMSE Multiuser Receivers for High Data Rate Indoor Wireless CDMA Networks," IEEE 6th International Conference on Universal Personal Communications Record, Oct. 12, 1997, pp. 5-9, IEEE, New York, NY, US.
Gu et al., "Adaptive Decision Feedback Equalization with MLSE Based on Predicted Signals," IEEE International Conference on Communications, Geneva, Switzerland, May 23-26, 1993, pp. 438-442, vol. 1, IEEE, New York, NY, US.
Lee et al., "A Maximum-Likelihood Sequence Estimator with Decision-Feedback Equalization," IEEE Transactions on Communications, Sep. 1977, pp. 971-979, vol. 25, No. 9, IEEE, Piscataway, NJ, US.
Ghaffar, R. et al. "Interference Suppression for Next Generation Wireless Systems." IEEE 69th Vehicular Technology Conference, 2009 (VTC Spring 2009), Apr. 26-29, 2009, Barcelona, Spain, pp. 1-5.

* cited by examiner

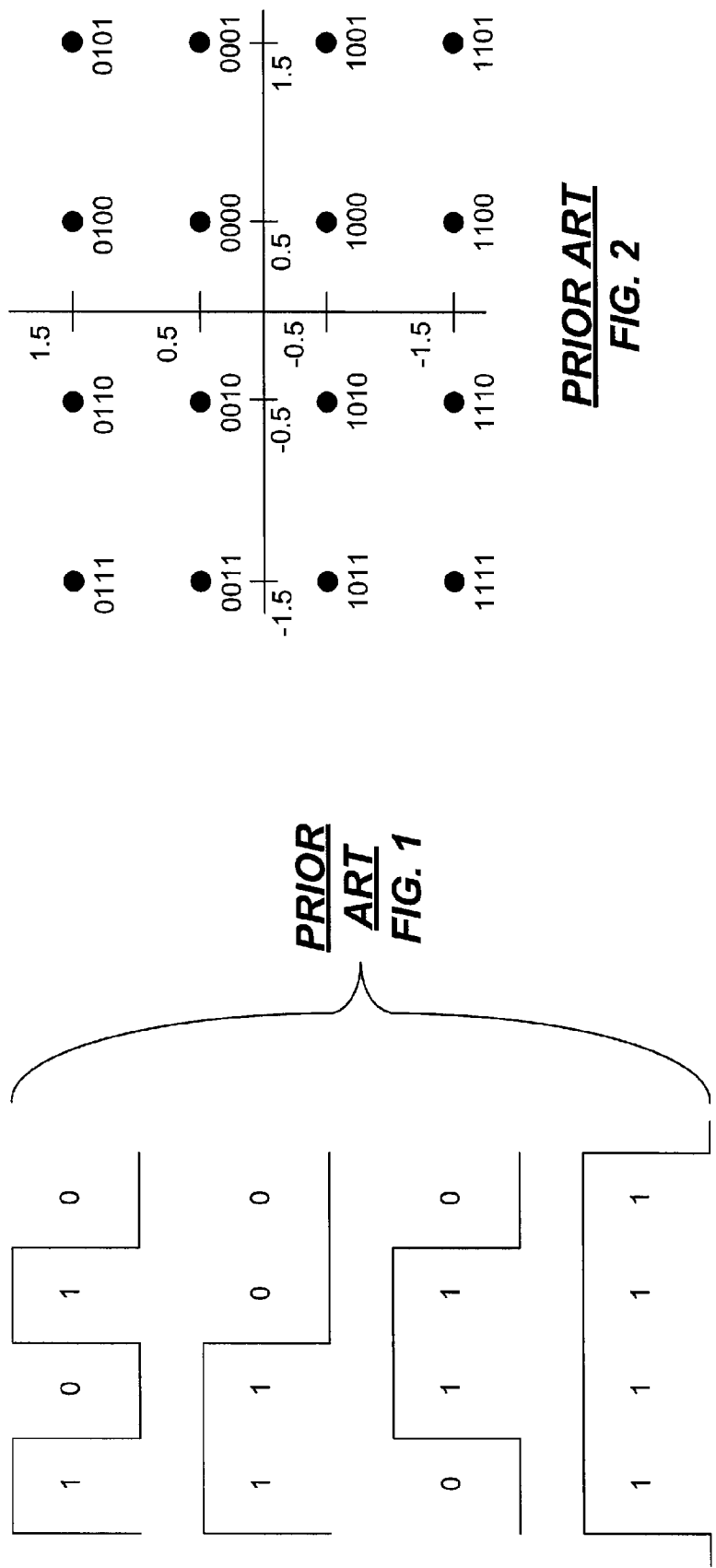

METHOD AND APPARATUS FOR EFFICIENT MULTI-SYMBOL DETECTION

RELATED APPLICATIONS

This application claims priority under 35 U.S.C. §120 as a continuation-in-part of U.S. patent application Ser. No. 12/035,846, entitled "A Method and Apparatus for Block-Based Signal Demodulation," as filed on 22 Feb. 2008, the entire contents of which are incorporated herein by reference.

TECHNICAL FIELD

The invention generally relates to communication signal processing, and particularly relates to simplifying the detection of digital data symbols transmitted, for example, using multiple, code division multiple access (CDMA) codes as used in the Third Generation (3G) of mobile wireless communications systems.

BACKGROUND

Mobile wireless communications systems have evolved from principally telephone voice services to provide higher data rates for mobile Internet browsing, MP3 music or TV and video. Transmission techniques are varied and include mixtures of FDMA, TDMA and CDMA. In the latter, a data stream is modulated upon a high chip-rate CDMA code that is preferably orthogonal to the codes used by other data streams, allowing the receiver to separate out its desired data stream from the others by correlating with a particular code. If the codes are truly orthogonal, correlation, also known as despreading, should separate out the desired data stream with complete cancellation of the other, unwanted data streams. However, orthogonal codes do not remain perfectly orthogonal when relatively delayed. Relatively delayed copies of the signal are received due to being reflected from large objects such as buildings and mountains, giving rise to multipath propagation.

To increase data rate to a given receiver, the receiver may be assigned to receive multiple data streams using different orthogonal codes. In one 3G system known as HSPA, the highest uplink data rate is provided by assigning three-quarters of the entire code space to one receiver. The standard for this system specifies assigning one code of spreading factor 2 to the receiver, which represents half the code space, and one code of spreading factor four, which represents half of the remaining code space. Using these codes, in a period of four CDMA chips, two spreading factor=2 symbols are transmitted overlapping one spreading factor=4 symbol, giving three data symbols per 4 code chips. Moreover, the symbols can each be 16QAM symbols of four bits each. A conventional "brute-force" detector for three such 16QAM symbols would hypothesize all $16^3=4096$ possibilities and determine the symbol triple that best explained the signal that was received through the multipath channel. The multipath channel characteristics are separately determined using the technique of channel estimation. However, testing 4096 hypotheses is onerous on signal processing circuits and thus an improved method and apparatus for determining the most likely received symbol triples is required.

A similar joint detection problem occurs in non-spread systems, such as GSM/EDGE and Long Term Evolution (LTE). In a cellular system, multiple users can be assigned the same channel resource (frequency subcarrier or time slot). Receiver performance can be improved by jointly detecting such users. Brute-force detection would require hypothesizing all combinations of the symbols from the multiple users. In the LTE uplink, self-interference can also be a problem, which can be alleviated by jointly detecting symbols in a block equalizer, such as a block decision feedback equalizer.

SUMMARY

Two or more multi-valued digital data symbols are modulated onto the same channel resource. A receiver receives the combined signal and forms detection statistics to attempt to recover the symbols. Due either to the symbol waveforms being non-orthogonal, or due to multipath distortion of orthogonal waveforms, the detection statistics do not completely separate the symbols with the result that each statistic comprises a different mix of the symbols. A receiver configured according to the teachings presented herein determines the symbols which, when mixed in the same way, reproduce the statistics most closely. In one or more embodiments, the inventive method comprises hypothesizing all but one of the symbols and subtracting the effect of the hypothesized symbols from the mixed statistics. The remainders are then combined and quantized to the nearest value of the remaining symbol. Thus for each hypothesis of all but one of the symbols, the remaining symbol is determined. A metric is then computed for each symbol hypothesis including the so-determined remaining symbol and the symbol set that produces the best metric is chosen as the decoded symbols.

However, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a diagram of known orthogonal coding, as may be used to encode multiple symbols into a symbol block.

FIG. 2 is a diagram of a known 16QAM constellation.

DETAILED DESCRIPTION

Figure 3:
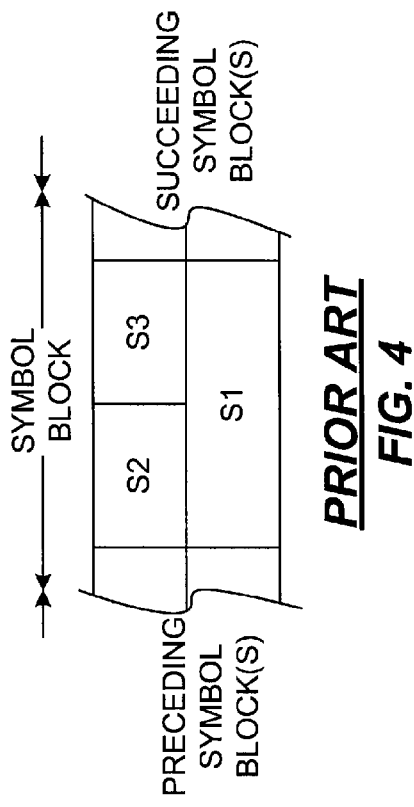
FIG. 3 is a diagram of known symbol coding, where three symbols are formed using length=2 and length=4 coding for combining in a symbol block.

FIG. 1 illustrates a set of four orthogonal codes, 1010, 1100, 0110, and 1111. The codes are orthogonal when as many bits agree as disagree. When these Boolean code representations are used to generate real signals, the Boolean values (1, 0) are usually mapped to arithmetic signal values (−1, 1) or the reverse. FIG. 2 illustrates a 16QAM constellation with Grey Code mapping for representing groups of four bits by a signal point in the complex plane with real and imaginary parts each taking on one of the four values +/−0.5 or +/−1.5. An alternative expression for the transmitted signal thus could be (b1+b2/2)+j(b3+b4/2). However, the mapping of four-bit groups to signal points is preferably Grey Code mapping of bit quadruples to signal points such that adjacent patterns, which are most likely to be confused due to noise, differ in only one bit and not two. However, if the bits b1, b2, b3, and b4 in the above expression can be determined, a symbol is identified, the 4-bit Grey code assigned to that symbol used as the decoded data.

A CDMA signal modulated with 16QAM symbols is obtained by choosing any code from FIG. 1 and multiplying each bit of it with the symbol value of the 4-bit group to be transmitted, as given by FIG. 2. Thus, in principle four 16QAM symbols could be transmitted in parallel by using all four codes of FIG. 1 to carry respective 16QAM symbols. After adding, the composite signal is often scrambled by applying a common, complex scrambling code which has the purpose of distinguishing transmissions from different transmitters using the same frequency. A receiver for such a signal could comprise receiving four signal samples r1, r2, r3, and r4 corresponding to the four code chips (after removing the above-mentioned, common, complex scrambling code) and forming R1=r1+r2+r3+r4 (correlation with code 1111); R2=r1−r2+r3−r4 (correlation with code 1010); R3=−r1+r2+r3−r4 (correlation with code 0110); and R4=r1+r2−r3−r4 (correlation with code 1100). Such correlations or detection statistics are often most simply computed by performing a Fast Walsh Transform (FWT) on the received values, after first having removed any common complex scrambling code.

The R's thus derived from the received signal samples r1, r2, r3, and r4 may be regarded as modified received signal samples to be used for further processing. Indeed, a formulation of the present invention based on this example correlation receiver will first be derived, but other types of chip-level preprocessing receivers such as a RAKE receiver, matched filtering, decision feedback equalization (DFE) or other equalizing receiver and noise whitening receivers could be employed, all of which, according to the present invention, still give rise to equations of the same form as Eq. (1) to Eq. (4) below.

In this sense, it should be understood that the teachings herein apply directly to CDMA and non-CDMA received signals. For example, efficient multi-symbol detection as taught herein may be applied to the types of direct-sequence (DS) CDMA signals used in Wideband CDMA (WCDMA) based communication systems, but also may be readily applied to received signal processing in communication systems based on the Long Term Evolution (LTE) standards, as promulgated by the Third Generation Partnership Project (3GPP). For example, efficient multi-symbol detection as taught herein advantageously applies to uplink signal processing in LTE systems.

Turning back to processing details, if code orthogonality is preserved in transmission, the resulting modified received signal values R1, R2, R3, R4 are simply equal to some channel constant Q times the original 16QAM signal values. More particularly, the Q-values determine how each R-value depends on each symbol value (S-value) in the block of symbol values to be detected. Thus, the Q-values may be termed dependence coefficients. Dividing by Q (or multiplying by $Q^*$ and dividing by $|Q|^2$) reproduces the symbol values except for added noise. Quantizing these "soft" symbol values to the nearest of the possible symbol values in the alphabet then gives the decoded symbol. The real and imaginary parts can be quantized separately. Quantizing the imaginary part to one of −1.5, −0.5, +0.5, and +1.5 yields the first two bits of the bit quadruple, and quantizing the real part likewise yields the other two bits. Thus with perfect orthogonality and no noise, we expect $Q \cdot S1 = R1$, $Q \cdot S2 = R2$, $Q \cdot S3 = R3$, and $Q \cdot S4 = R4$.

With imperfect orthogonality however, R1 will be corrupted by some amount of S2, S3 and S4, and likewise for the other correlation values, with the result given by equation 1 below:

$$\begin{bmatrix} Q11 & Q12 & Q13 & Q14 \\ Q21 & Q22 & Q23 & Q24 \\ Q31 & Q32 & Q33 & Q34 \\ Q41 & Q42 & Q43 & Q44 \end{bmatrix} \begin{pmatrix} S1 \\ S2 \\ S3 \\ S4 \end{pmatrix} = \begin{pmatrix} R1 \\ R2 \\ R3 \\ R4 \end{pmatrix}. \quad \text{Eq. (1)}$$

The Q-values determine how each R-value depends on each S-value, and so may be termed dependence coefficients.

Attempting to solve such equations by inverting the 4×4 Q-matrix is not advisable, as it will in general result in magnifying the receive noise present on the R-values. Instead, sets of symbols (S1, S2, S3, S4) may be hypothesized, multiplied by the Q matrix, and the results compared for a match to the values (R1, R2, R3, R4). The symbol set producing the best match is then selected. The latter method produces a more accurate result because the symbols are constrained to their discrete values, unlike matrix inversion, which does not produce discrete values. However, hypothesizing four 16QAM symbols means computing and testing $16^4=65,536$ metrics, or, in general, $M^N$ metrics, where N is the number of symbols and M is the size of the symbol alphabet. We now disclose how the number of metrics to be computed can be reduced to $M^{N-1}$, or 4096 tests in the above 16QAM example.

First, remove every symbol except one from the left-hand-side (LHS) of the above equations to the right-hand-side (RHS), obtaining, for example:

$Q11 \cdot S1 = R1 - Q12 \cdot S2 - Q13 \cdot S3 - Q14 \cdot S4 = R1'$, $Q21 \cdot S1 = R2 - Q22 \cdot S2 - Q23 \cdot S3 - Q24 \cdot S4 = R2'$, $Q31 \cdot S1 = R3 - Q32 \cdot S2 - Q33 \cdot S3 - Q34 \cdot S4 = R3'$, and $Q41 \cdot S1 = R4 - Q42 \cdot S2 - Q43 \cdot S3 - Q44 \cdot S4 = R4'$. Eq. (2)

Thus the dependence of the R-values on the values S2, S3, and S4 is removed. Now, on the assumption that receiver noise on each R-value has the same RMS value and are uncorrelated with each other, the best value of S1 is found by weighting each equation by the conjugate of the Q-value on the left, and adding, obtaining $[|Q11|^2+|Q21|^2+|Q31|^2+|Q41|^2]S1=[Q11^*R1'+Q21^*R2'+Q31^*R3'+Q41^*R4']$. Thus, $$S1 = \frac{\begin{bmatrix} Q11 * R1' + Q21 * R2' + \\ Q31 * R3' + Q41 * R4' \end{bmatrix}}{[|Q11|^2 + |Q21|^2 + |Q31|^2 + |Q41|^2]} \quad \text{Eq. (3)}$$

The above is the "optimum diversity combiner" solution for determining S1, given the four independent equations. The result is a "soft" value for S1 (e.g., an unquantized value), which must now be quantized to the nearest discrete symbol value. The real and imaginary parts may be quantized separately, as follows: (i) determine the sign; and (ii) determine if the magnitude is greater or less than 1. This quantizing operation determines, for the 16QAM example, whether the value is nearest to −1.5, −0.5, +0.5 or +1.5, as required.

The above process is carried out for each of the 4096 possible combinations of the symbol triples (S2, S3, S4) and the resulting quantized value of S1 is associated with each to obtain a candidate symbol quadruple (S1, S2, S3, S4). Instead of testing 65,536 possibilities, it is now only necessary to test which of the 4096 candidates best explains the received signal sample values. This is done by computing for each a metric which is the sum of the squares of the magnitudes of the mismatch between the LHS and RHS of the equations when the candidate symbol set is substituted, and choosing the candidate symbol set giving the lowest metric.

Much reduction of computation is possible by noting that Eq. (3) may be written $$S1 = R'' - Q2' \cdot S2 - Q3' \cdot S3 - Q4' \cdot S4 \qquad \text{Eq. (4)}$$

where $$R'' = [Q11^* R1 + Q21^* R2 + Q31^* R3 + Q41^* R4]/A,$$

where $$A = [|Q11|^2 + |Q21|^2 + |Q31|^2 + |Q41|^2], \text{ and}$$

$$Q2' = [Q11^* Q12 + Q21^* Q22 + Q31^* Q32 + Q41^* Q42]/A,$$

$$Q3' = [Q11^* Q13 + Q21^* Q23 + Q31^* Q33 + Q41^* Q43]/A,$$
and $$Q4' = [Q11^* Q14 + Q21^* Q24 + Q31^* Q34 + Q41^* Q44]/A,$$

all of which may be pre-computed only once. R" is a weighted combination of the original signal samples and Q2', Q3' and Q4' may be termed modified dependence coefficients.

Thus Eq. (4) describes removing from the combined signal value R" the dependence on S2, S3, and S4 by using the modified dependence coefficients. The value R" may be equated to a matched filtered received value, as often arises in equalizers using an Ungerboeck metric formulation. Furthermore, there is a 4-fold rotational symmetry in the term −Q2'S2−Q3'S3−Q4'S4 which allows the equation to be computed for values of S2 only in the first quadrant, and then values with S2 in the other quadrants are determined by rotating the result through 90, 180 and 270 degrees, all of which require only exchange of real and imaginary parts and sign changes.

Once the candidate symbol groups (S1, S2, S3, S4) have been identified as above, testing to see which best fulfills Eq. (1) may be simplified as follows. The sum-square error in satisfying the four included equations is the metric to be minimized, and is equal to:

$$|Q11 \cdot S1 + Q12 \cdot S2 + Q13 \cdot S3 + Q14 \cdot S4 - R1|^2 + |Q21 \cdot S1 + Q22 \cdot S2 + Q23 \cdot S3 + Q24 \cdot S4 - R2|^2 + |Q31 \cdot S1 + Q32 \cdot S2 + Q33 \cdot S3 + Q34 \cdot S4 - R3|^2 + |Q41 \cdot S1 + Q42 \cdot S2 + Q43 \cdot S3 + Q44 \cdot S4 - R4|^2. \qquad \text{Eq. (5)}$$

The sub-terms such as $Q12 \cdot S2 + Q23 \cdot S3 + Q24 \cdot S4$ are required to be computed for all 4096 combinations of S2, S3, and S4. However, such terms may be split into real and imaginary parts, by letting $Q=(U+jV)$ and $S=(X+jY)$ with corresponding indices, thus obtaining:

$$Q12 \cdot S2 + Q23 \cdot S3 + Q24 \cdot S4 = [(X2 \cdot U12 + X3 \cdot U23 + X4 \cdot U24) - (Y2 \cdot V12 + Y3 \cdot V23 + Y4 \cdot V24)] + j [(X2 \cdot V12 + X3 \cdot V23 + X4 \cdot V24) + (Y2 \cdot U12 + Y3 \cdot U23 + Y4 \cdot U24)]$$

Letting $$T1(X2,X3,X4) = (X2 \cdot U12 + X3 \cdot U23 + X4 \cdot U24),$$

$$T2(Y2,Y3,Y4) = (Y2 \cdot V12 + Y3 \cdot V23 + Y4 \cdot V24),$$

$$T3(X2,X3,X4) = (X2 \cdot V12 + X3 \cdot V23 + X4 \cdot V24), \text{ and}$$

$$T4(Y2,Y3,Y4) = (Y2 \cdot U12 + Y3 \cdot U23 + Y4 \cdot U24),$$

it may be noted that there are only 8 values of each of T1, T2, T3 and T4 to be computed, as the X and Y are only 2-bit values. These may be further arranged so that no multiplications are required. Thus, by pre-computing the 4×8 T-values, terms such as $Q12 \cdot S2 + Q23 \cdot S3 + Q24 \cdot S4$ may be computed just by adding or subtracting two of the T-values to obtain each of the real and the imaginary parts. Likewise the term such as $Q31 \cdot S1$ is required for all 16 values of S1, but computing imaginary parts and real parts separately, taking into account that half of the values are just the negatives of the other half, reduces the effort by four. Furthermore, since the real and imaginary parts are only 2-bit values, multiplications may be avoided.

Figure 4:
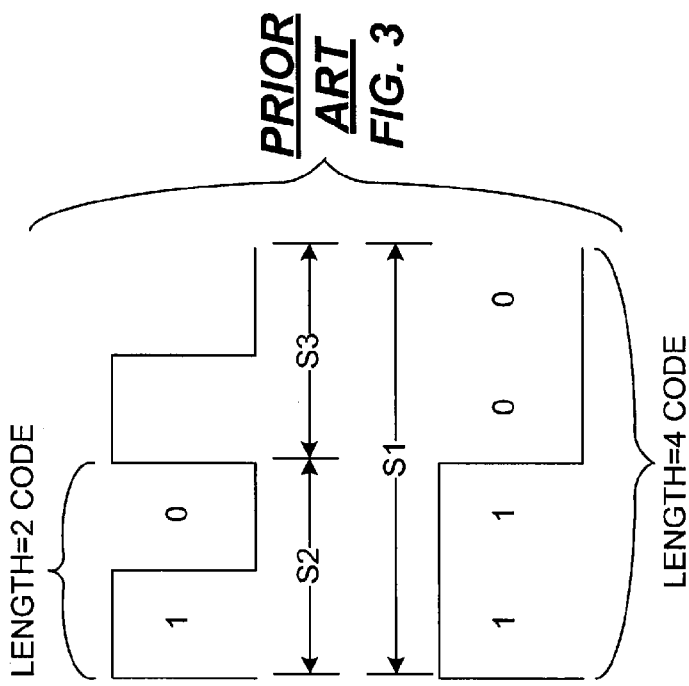
FIG. 4 is a diagram of an example symbol block structure as might arise using the coding of FIG. 3, such as is contemplated for processing via efficient multi-symbol detection as taught herein.
Figure 5:
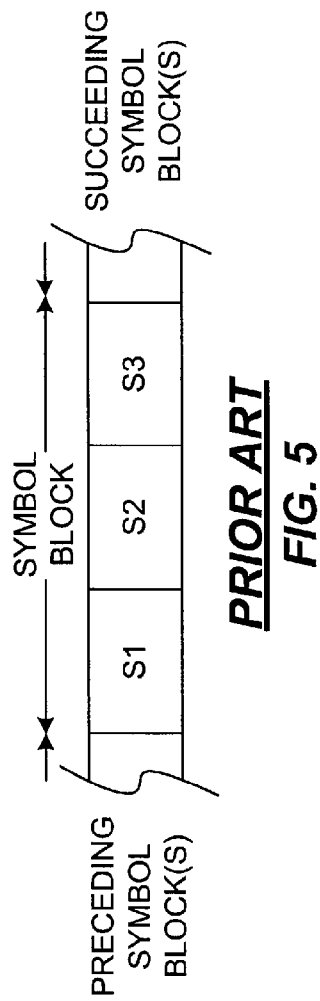
FIG. 5 is a diagram of another example symbol block structure, such as is contemplated for processing via efficient multi-symbol detection as taught herein.

In one envisaged application, the HSPA uplink, there are only three 16QAM symbols to be determined. FIG. 3 illustrates how, in the HSPA uplink, two of the symbols (S2, S3) use a length=2 CDMA code and the third (S1) uses a length=4 code, and FIG. 4 illustrates the corresponding symbol block structure. From FIG. 4, one sees that a succession of symbol blocks can be transmitted time-wise, with each symbol block including two length=2 code symbols (S2, S3), and one length=4 code symbol (S1). The symbols S1, S2, and S3 within any one such block are efficiently detected according to the efficient multi-symbol detection method taught herein, by operating on the received signal samples representing the symbol block, where inter-block interference—i.e., interference arising from preceding and succeeding symbol blocks has been suppressed by other means, namely, a block-wise equalizer such as a DFE equalizer, inverse channel equalizer, or combination of the two, as described in the co-filed application to Bottomley identified herein below. Note, too, that the teachings presented herein apply directly to other symbol block structures. For example, in FIG. 5, one sees a stream of symbol blocks, each comprising three successive symbols, S1, S2, and S3. Of course, a lesser or greater number of symbols may be included in the symbol blocks of interest.

Thus, as an example, a receiver according to one or more embodiments of the invention receives four chip-spaced signal samples (for a given symbol block) and may preprocess them to remove interference from previous or future symbols blocks. The resulting pre-processed values r1, r2, r3, r4 may then be decoded according to one implementation of the invention as follows.

Referring back, for example, to the FIG. 3 symbol block structure and coding, the receiver forms R2=r1−r2 (correlation with length=2 code 10); R3=r3−r4 (correlation with length=2 code 10); and R1=r1+r2−r3−r4 (correlation with length=4 code 1100). Separately, the receiver shall have determined channel coefficients which, together with the CDMA codes, and possibly other objects such as an overall complex scrambling code, are used to determine the 3×3 matrix of Q-values describing how the three symbols (S1, S2, and S3) mix to produce the three correlations R1, R2, R3.

More detail on preprocessing and on using channel estimates, CDMA codes and scrambling codes to compute the Q-matrix values are contained in U.S. application Ser. No. 12/035,846 (the '846 application). As previously indicated, the instant application claims priority from and wholly incorporates by reference the '846 application, which is commonly owned and co-pending with the instant application. In the '846 application, block-based equalization is used to remove inter-block interference between symbol blocks in a stream of symbol blocks, and joint detection is used to detect the particular combination of symbols within a symbol block. Those block-based equalization teachings may be applied herein, as part of received signal sample preprocessing, such that the teachings provided herein for efficient multi-symbol detection may be understood as a particularly advantageous form of the joint detector taught in the '846 application (e.g., as joint detector 82 shown in FIG. 4 of that application.)

Figure 6:
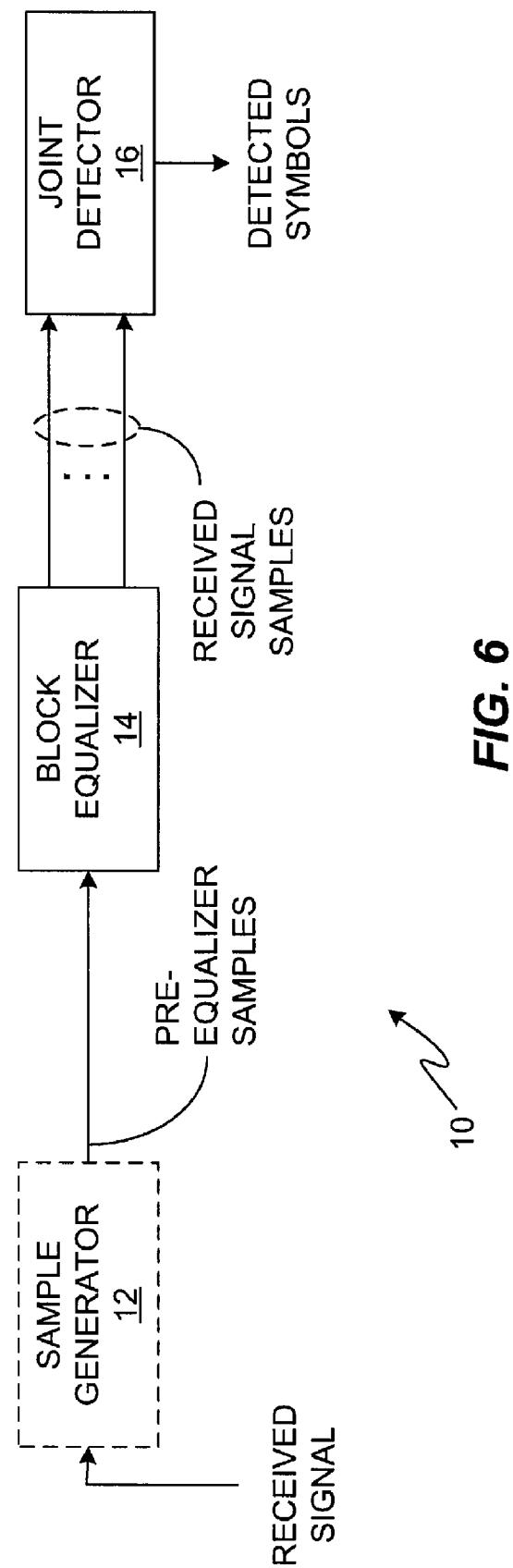
FIG. 6 is a block diagram of one embodiment of a receiver apparatus configured for efficient multi-symbol detection as taught herein.

FIG. 6 at least partly illustrates one embodiment of a receiver 10, wherein a sample generator 12 produces pre-equalizer samples based on initially processing an (antenna-received) signal. These pre-equalizer samples may be chip samples, despread values, Rake-combined or Generalized Rake (G-Rake) combined values, etc. In any case, a block-equalizer 14, which may be configured as a block-based decision feedback equalizer (DFE) as taught in the '846 application, produces received signal samples that are pre-processed, at least in the sense that the signal samples representing a given symbol block have inter-block interference suppressed from them. Thus, the joint detector 16 is provided received signal samples for each symbol block of interest, for its use in efficiently performing multi-symbol detection (joint detection) of the symbols within each such symbol block of interest, according to the teachings presented herein.

Figure 7:
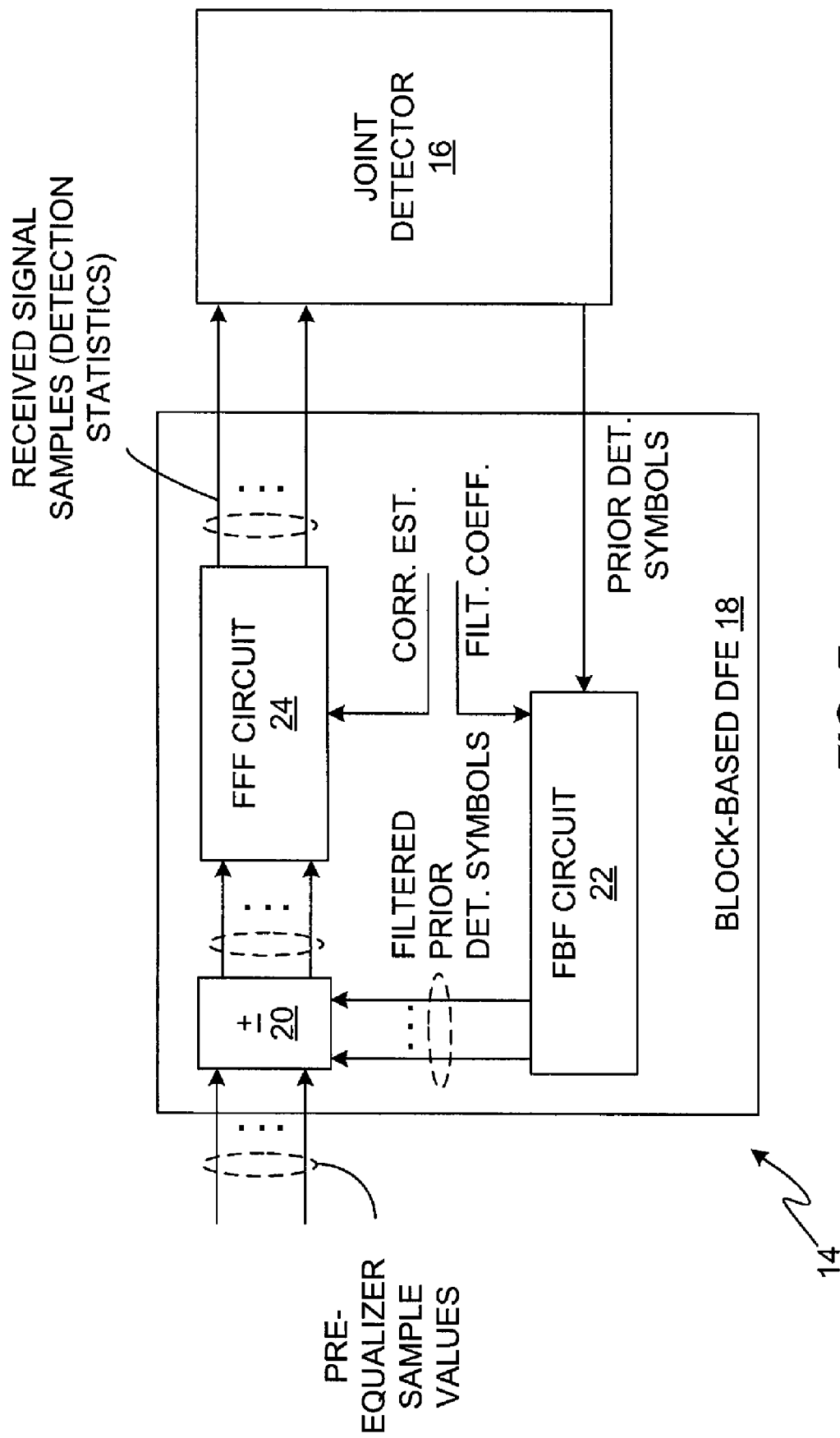
FIG. 7 is a block diagram of one embodiment of the block equalizer illustrated in FIG. 6.

FIG. 7 provides more example details regarding the block-based DFE aspects of pre-processing. In particular, FIG. 7 illustrates that the pre-equalizer sample values (obtained, e.g., by filtering, amplifying, downconverting, and despreading antenna-received signals), are input to the block equalizer 14, which here is implemented as a block-based DFE 18. The DFE 18 includes a combining circuit 20, which performs subtractive cancellation of inter-block interference arising from preceding symbol blocks. It performs this function based on being supplied with appropriately filtered versions of prior detected values. These values are output by a feedback filter circuit 22 that has filter coefficients determined from prior-block dependence coefficients and is provided with prior detected symbols from the joint detector 16.

As shown, the output values from the combining circuit 20 serve as inputs to a feedforward filter circuit 24, whose filter coefficients are determined according to succeeding block interference estimates, which may be based on impairment correlation estimates, etc., relating the effects of one or more succeeding symbol blocks on the sample values of a current symbol block of interest. The outputs of the feedforward filter circuit 24 thus are a set of received signal sample values that have been preprocessed for suppression of inter-block interference. Such sample values may be produced for each symbol block to be detected by the joint detector 16.

Continuing with the above joint detection example, then, the pre-processed values r1, r2, r3, r4 or R1, R2, R3, R4 for a given symbol block are decoded according to one implementation of the invention as follows. Once the Q-matrix values and the R-values are obtained, the symbol values S1, S2, S3 are determined by the invention substantially as described above, except that only two symbols, S2 and S3, need be hypothesized in order to determine the third, S1. Therefore, only 256 candidate symbol triples are produced for testing. The metrics for each of the 256 symbol triples are then computed efficiently, as described above, and the symbol triple yielding the lowest metric is the decoded result.

If desired, once hard symbol decisions are available, they may be back substituted two at a time to give soft decisions for the third, by using Eq. (3), for example, and similar equations for the other symbols. Soft bit values can also be obtained by computing metric differences corresponding to symbols in which the bit of interest has been flipped. Soft decisions are useful when they are to be further processed by an error correction decoder, such as a turbo decoder. Turbo decoders generally process to refine bit log-likelihood ratios; therefore the step of converting soft symbol values to bitwise log-likelihood ratios generally precedes processing by a turbo decoder.

The above method determines the most likely set of symbols from the received samples corresponding to the current multi-symbol, in the case that the noise on the different correlation values is uncorrelated and of equal RMS value, and ignoring interference from adjacent multi-symbols. In U.S. Pat. Nos. 6,963,532 and 6,215,762 to Applicant Dent, entitled "Communications system and method with orthogonal block encoding", methods are described for removing adjacent multi-code symbol interference, therein termed "inter-vector interference" because the symbols of a multi-code symbol are considered to form a vector of symbols. The method comprises subtracting the effects of the earlier-determined adjacent multi-symbol, while using a feedforward filter with matrix coefficients to remove the effect of interference from as yet undetermined, future symbols. The '532 and '762 patents are also hereby incorporated by reference herein. Thus, techniques for suppressing inter-block interference in advance of sample processing for joint detection may be taken from the '532 and '762 patents, or from the earlier described '846 application, which further describes how to determine the feedforward matrix coefficients better to account for other impairments such as noise and other signals.

In the case where the noises on the R-values are not uncorrelated or are of unequal value, it is first necessary to modify Eq. (1) to obtain uncorrelated noises of equal RMS value. This may be done by multiplying both sides by a decorrelating matrix D, obtaining modified Q values and modified R values which may then be subjected to the inventive process as already described in order to decode the symbols.

If (n) is a vector of the noises before decorrelation, then the noises become modified to $(n')=[D](n)$. The correlations between the (n') are then given by the expected values of $(n')(n')^{\#}=[D](n)(n)^{\#}[D]^{\#}$ averaged over many noise samples. By substitution it is evident that $[D](n)(n)^{\#}[D]^{\#}=I$, the identity matrix, if $[D]^{\#}[D]=(n)(n)^{\#}=[C]^{-1}$, where C is the expected or average value of $(n)(n)^{\#}$, i.e., the correlation matrix. Because D is Hermitian, $D^{\#}=D$, and thus $D^2=C^{-1}$. D is thus the square root of the inverse correlation matrix and is given by $$D=E^{\#}\Lambda^{-1/2}E$$

where E is the matrix of Eigenvectors of C and $\Lambda$ is a diagonal matrix of its Eigenvalues. Thus letting Q'=DQ and R'=DR, we get $$[Q'](S)=(R') \qquad \text{Eq. (6)}$$

Because Eq. (6) is of exactly the same form as Eq. (1), it may be solved for the best values of symbols S exactly as was already described for Eq. (1).

This calculation of D may be based on averaging the noise correlation matrix over many symbol blocks, and thus does not necessarily need to be repeated for every symbol. However, it is preferable to determine the expected correlation matrix by expressing it in terms of the varying common scrambling codes combined with the less rapidly varying channel estimates. In this way, updated values of the correlation matrix are available for every symbol, due to the common scrambling codes changing in a known way, and it is desirable to determine the change to D thereby caused. Depending on the number of scrambling sequence chips on which the correlation matrix depends and the rate at which the channel changes, it may be more efficient to compute D for all combinations of those scrambling chips at intervals determined by the rate of change of channel coefficients.

The issue of frequently recalculating the square-root matrix D may be avoided by processing received signal values r directly, before removal of the common, complex, scrambling code and before correlation with the Walsh codes. FIG. 3 shows a particular example where three 16QAM symbols are coded into four CDMA chips r1, r2, r3, r4. The chips are linearly dependent on the symbol values, so that after reception through a multipath channel one may still write:

$$Q11 \cdot S1 + Q12 \cdot S2 + Q13 \cdot S3 = r1,$$

$$Q21 \cdot S1 + Q22 \cdot S2 + Q23 \cdot S3 = r2,$$

$$Q31 \cdot S1 + Q32 \cdot S2 + Q33 \cdot S3 = r3, \text{ and}$$

$$Q41 \cdot S1 + Q42 \cdot S2 + Q43 \cdot S3 = r4.$$

In the above, the values r1, r2, r3, r4 may be received values that have already been preprocessed in some way, such as the use of block DFE to remove inter-symbol-vector interference from adjacent symbol vectors. The Q-values embody the complex scrambling code, the spreading codes assigned to each symbol, and multipath channel coefficients. In the absence of multipath, the Q-matrix would be given by $$\begin{bmatrix} Q11 & Q12 & Q13 \\ Q21 & Q22 & Q23 \\ Q31 & Q32 & Q33 \\ Q41 & Q42 & Q43 \end{bmatrix} = \begin{bmatrix} X1 & 0 & 0 & 0 \\ 0 & X2 & 0 & 0 \\ 0 & 0 & X3 & 0 \\ 0 & 0 & 0 & X4 \end{bmatrix} \begin{bmatrix} w11 & w12 & w13 \\ w21 & w22 & w23 \\ w31 & w32 & w33 \\ w41 & w42 & w43 \end{bmatrix}.$$

where X1, X2, X3, X4 are the successive values of the common, complex, scrambling code applied to the four chips, and the three spreading codes assigned are (w11, w21, w31, w41), (w12, w22, w32, w42) and (w13, w23, w33, w43).

In the special example of FIG. 3, each chip depends on only two symbols, not three, and the Q-matrix, at least in the absence of multipath propagation is given by:

$$\begin{bmatrix} Q11 & 0 & Q13 \\ Q21 & 0 & Q23 \\ 0 & Q32 & Q33 \\ 0 & Q42 & Q43 \end{bmatrix} = \begin{bmatrix} X1 & 0 & 0 & 0 \\ 0 & X2 & 0 & 0 \\ 0 & 0 & X3 & 0 \\ 0 & 0 & 0 & X4 \end{bmatrix} \begin{bmatrix} w11 & 0 & w13 \\ w21 & 0 & w23 \\ 0 & w32 & w33 \\ 0 & w42 & w43 \end{bmatrix}.$$

However, multipath propagation or preprocessing will likely have the effect of making the zero terms non-zero, so that in general all 4×3 Q-elements must be considered to be non-zero. The equations are now over-dimensioned, but may still be written as $$[Q](S)=(r).$$

The noise correlation matrix and derived value of the decorrelating matrix D are now 4×4 matrices, giving decorrelated equations [Q'](S)=(r') where Q'=DQ and r'=Dr, and now of size 3×4 and 1×4 respectively. By hypothesizing two of the symbols, such as S2 and S3, subtracting their influence on r' to obtain $$R1'=r1'-Q12' \cdot S2 - Q13' \cdot S3,$$

$$R2'=r2'-Q22' \cdot S2 - Q23' \cdot S3,$$

$$R3'=r3'-Q32' \cdot S2 - Q33' \cdot S3, \text{ and}$$

$$R4'=r4'-Q42' \cdot S2 - Q43' \cdot S3.$$

The best value of the third symbol (e.g. S1) is given by Eq. (3) by using the element values of Q' instead of Q. That value of S1 is then stored against the values of S2 and S3 used to obtain it, and metrics for each of the 256 symbol triples computed using Eq. (5) with the term in S4 omitted.

A further mathematical manipulation however avoids the need to compute square-root matrix D. First write the metric $(R-QS)^{\#}C^{-1}(R-QS)$ in terms of the hypothesized symbols $S'^{\#}=(S2, S3, \ldots)$ and the non-hypothesized symbol S1. To do this, let $Q^{\#}C^{-1}Q$ be denoted by the matrix [U], and partition U into its first column (u) and the rest, [Udim]. Then [Q](S)= (u)S1+[Udim](S'). Thus (R−QS)=(R−Udim·S'−(u)S1)=(R'− (u)S1) where (R')=(R)−[Udim](S'). Thus the metric becomes $$R^{\#}C^{-1}R - 2Re\{R^{\#}C^{-1}u \cdot S1 + u^{\#}C^{-1}u \cdot |S1|^2\}.$$

But $u^{\#}C^{-1}u=a$ is a real scalar, and $R^{\#}C^{-1}u=z^*$ is a complex scalar. Therefore the soft value (unquantized value) of S1 which minimizes the above metric is simply S1=z/a. The quantized symbol value is then the value in the symbol alphabet nearest to the soft value given above, the determination of which by separately quantizing real and imaginary parts to 2 bits was already explained above. Then, having obtained the quantized symbol S1, it is combined with the others to compute an associated metric using the above metric expression, which uses the matrix $C^{-1}$ explicitly and does not require the square root of $C^{-1}$ to be calculated.

The method may also be used where there are more than four chips, each dependent on a set of symbols to be determined. For example, a diversity receiver having two antennas would supply four chips from each, and the resulting Q-matrix would be of dimension 8×3 for decoding three symbols, unless antenna signals are combined prior to detection. When chips from several antennas are processed to decode the symbols, use of the appropriate inverse correlation matrix $C^{-1}$ has the additional benefit of reducing interference that has a different angle-of-arrival than the wanted signal.

Other variations of the invention are possible. For example, in the special case of 16QAM symbols, it may be realized that the symbol value is expressible as a linear combination of its four constituent bits. Thus an equation similar to Eq. (1) can be written, equating received signal values or correlation values to a vector of bit values multiplied by a Q-matrix of dependency coefficients.

In the method described above, we chose to hypothesize 8 bits constituting two symbols in order to obtain a candidate solution for the four bits of the third symbol. However, any 8 bits, or more or less, could in principle be hypothesized in order to obtain candidate values for the remainder, which would each be quantized to the '1' value or the '0' value. The candidate bit vectors would then be used to compute metrics and the bit vector having the best metric selected.

Figure 8:
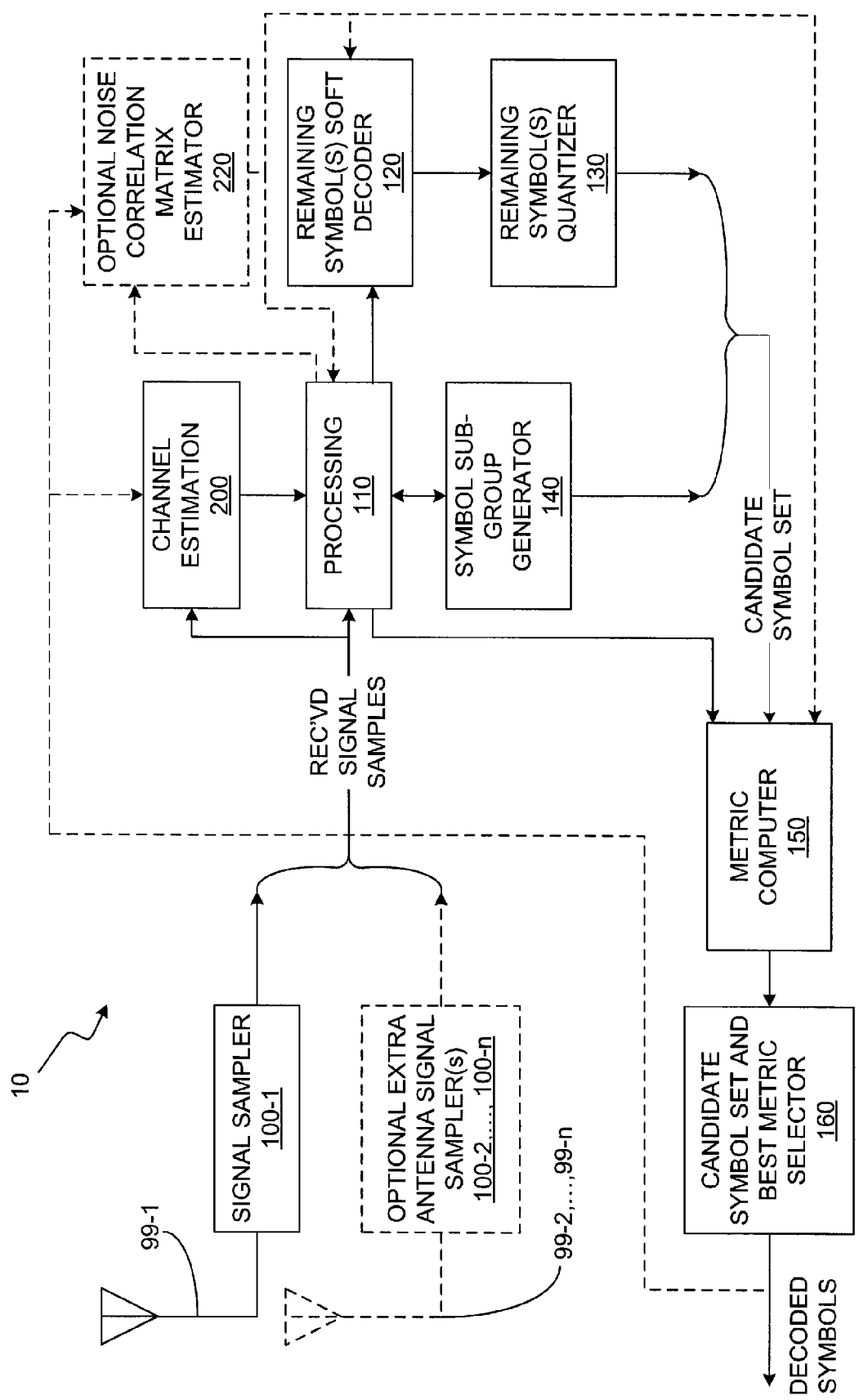
FIG. 8 is a block diagram of another embodiment of a receiver apparatus configured for efficient multi-symbol detection as taught herein.

FIG. 8 shows another embodiment of a receiver apparatus 10 for implementing the inventive multi-symbol detection processing taught herein. It should be understood that the illustrated embodiment may be simplified, e.g., transmission circuitry, user interface elements, and the like also may be present. Indeed, in at least one embodiment the receiver 10 comprises a wireless communication device, such as a cellular radiotelephone, PDA, pager, palmtop/laptop computer, network interface card, wireless adaptor/module, or other communication transceiver device or system.

It also should be understood that FIG. 8 may represent a functional circuit arrangement, rather than a literal physical circuit arrangement. For example, one or more of the illustrated entities may be implemented in a baseband signal processor or other digital processing circuit or circuits (e.g., microprocessor/DSP circuits). For example, the block DFE and joint detection processing functions described earlier regarding FIG. 6, and variations of them, can be incorporated into the processing elements illustrated in FIG. 8.

Broadly, the functional processing of the illustrated entities may be implemented in hardware, software, or any combination thereof, and it should be understood that at least some entities can be implemented together in the same processing circuits, such as through appropriate software/firmware configuration. As such, at least part of the inventive processing taught herein may be implemented in the form of a computer program comprising program instructions for implementation on one or more digital processors. The computer program and any supporting data and configuration information can, as is well understood by those skilled in the art, be stored in a memory device included within the receiver 10.

With this implementation flexibility in mind, a signal sampler 100-1 is provided for initially processing signals received on an antenna (e.g., antenna 99-1). It filters, amplifies samples and converts the antenna-received signal to obtain a stream of digital sample values of at least one sample per symbol. As a non-limiting example, the receiver apparatus 10 is in one or more embodiments configured to obtain the received signal samples by processing a GSM/EDGE signal. In another non-limiting example, the receiver apparatus 10 is configured to obtain the received signal samples by processing an LTE signal. Also, it should be understood that the received signal samples may comprise samples of signals received using two or more antennas.

In the case of multicode CDMA modulation, there are several chips per symbol and the signal may be sampled at several samples per chip in order to facilitate preprocessing, such as matched filtering, equalization of interference from adjacent multi-code symbols, or selection of an optimum sample timing. Optionally, additional signal samples 100-2 to 100-n can be used to sample signals from additional antennas (e.g., 99-2, . . . , 99-n) for diversity reception, beamforming or spatial nulling, all of which are encompassed by proper determination of the aforementioned noise correlation matrix C, which is performed by optional noise correlation matrix estimator 220.

Estimation of the noise correlation matrix is beneficial when significant correlation between the noise plus interference on different signal samples is expected. Such is the case with using multiple antennas when interference arrives from distinct directions different than the wanted signal direction, or arrives through a multipath propagation channel with a different frequency response than the wanted signal propagation channel. Estimation of the noise correlation matrix may not be necessary in other applications.

In any case, channel estimator 200 processes received signal samples to determine the multipath propagation channel for at least the wanted signal. Channel estimation can be done by correlating the received signal samples with a known code sequence that is included in the transmitted signal. If the known code sequence overlaps the information symbol bearing part of the wanted signal in both time and frequency, it may be subtracted out in processor 110 once the amount (amplitude, phase and delay) has been determined by channel estimator 200.

The above description of the invention includes correlating the received signal samples with CDMA codes and processing the correlations, or processing the received samples directly. Either can be done by processor 110 which is meant to be general enough to perform either. Likewise, noise correlation matrix estimator 220 is intended to be sufficiently general to estimate any or all of the noise correlation matrix, the inverse of the noise correlation matrix or the square root of the inverse of the noise correlation matrix, depending on the implementation chosen. Likewise, processor 110 is envisaged to compute dependence coefficients Q, Q' based on the channel estimates and a priori knowledge of the symbol modulation and coding scheme, with the dependence coefficients describing how processed signal samples depend on the information symbols contained therein.

Further, the processor 110 or another one of the receiver apparatus's one or more processing circuits may be configured to compute the first modified signal samples detailed herein by correlation of the received signal samples with a number of CDMA codes. Additionally or alternatively, the first modified signal samples also may be obtained by matrix multiplication of the received signal samples by the square root of the inverse of a noise correlation matrix. Similarly, the processor 110 or another one of the receiver apparatus's one or more processing circuits may be configured to compute the modified dependence coefficients Q' based on matrix multiplication by the inverse of a noise correlation matrix.

In any case, symbol sub-group generator 140 generates, in turn, all possibilities for a subgroup of the information symbols carried by the received signal samples. For example, the subgroup can comprise all except one 16QAM symbol. The subgroup is presented to processor 110 which subtracts its influence using the channel estimates from channel estimator 200, a priori knowledge of the signal modulation and coding (or the dependence coefficients derived therefrom) and the appropriate derivative of the noise correlation matrix, if used. Remaining soft symbol decoder 120 determines the remaining symbols in the set which are not hypothesized by symbol subgroup generator 140, by combining processed samples from processor 110, again using the appropriate derivative of the noise correlation matrix, if required. Soft symbols from soft symbol decoder 120 are then quantized by symbol quantizer 130 to the nearest symbol value in the symbol alphabet. The quantized symbol from quantizer 130 together with the subgroup from subgroup generator 140 then form a complete set of symbols which is a candidate symbol set.

A candidate symbol set is produced for each symbol subgroup generated by subgroup generator 140 and presented to metric computer 150 which computes a metric based on processed samples from processor 110, the candidate symbol set, and the appropriate derivative of the noise correlation matrix if required. The metric computed describes how well the candidate symbol set explains the received samples, given the channel estimates and the noise correlation matrix. Candidate symbol set selector 160 then selects the candidate symbol set that yields the best metric.

Thus, the one or more processing circuits of the receiver apparatus 10 (e.g., processor 110, decoder 120, quantizer 130, subgroup generator 140, metric computer 150, and candidate set/best metric selector 160) implement an efficient method of joint detection, where multiple symbols within a symbol block of interest are efficiently decoded according to the teachings presented herein. For example, using the inventive apparatus of FIG. 8 to process received signals such as shown in FIG. 3, which comprises three 16QAM symbols, only 256 metrics have to be computed to determine the most likely set of three symbols. This processing is a significant improvement over conventional "brute force" methods which would require computation of 4096 metrics for determination of the three 16QAM symbols. (It also should be understood that these processing circuits, e.g., processor 110, or other processing elements within the receiver apparatus 10, can be configured to provide received signal sample preprocessing. Such processing preferably includes, as discussed for FIGS. 6 and 7, block-based DFE equalization of the received signal samples for a given symbol block, to remove the effects of inter-block interference.)

Figure 9:
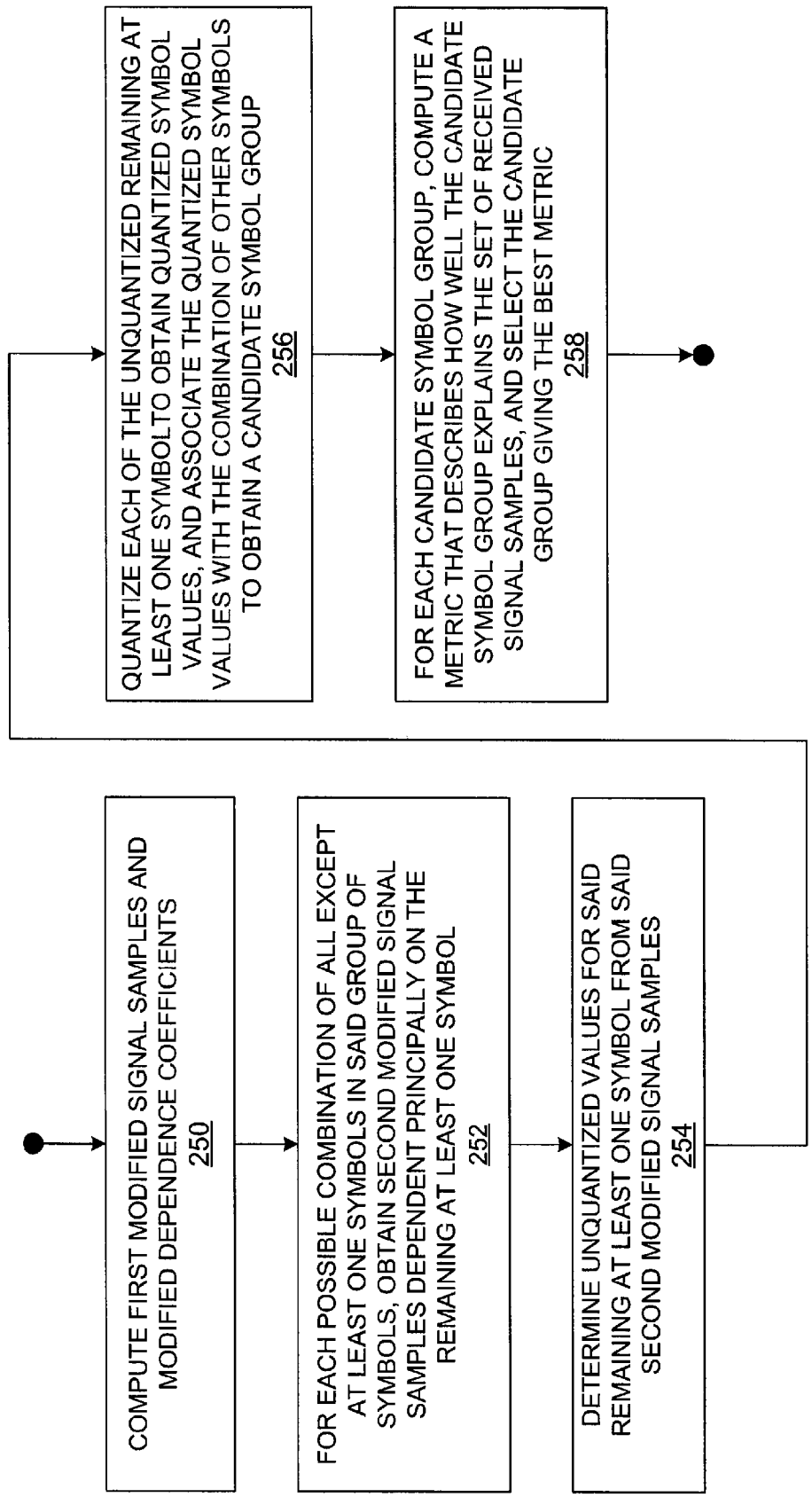
FIG. 9 is a flow diagram of one embodiment of processing logic for implementing a method of efficient multi-symbol detection as taught herein.

FIG. 9 illustrates one embodiment of processing efficient multi-symbols detection, where the receiver apparatus 10 of FIG. 8 can be configured via hardware or software to carry out the illustrated processing operations. Regardless of the hardware and/or software implementation details, FIG. 9 illustrates one embodiment of a method for decoding a group of symbols from a set of received signal samples that depend on each symbol of the group to an extent depending on an associated dependence coefficient. For example, using earlier-introduced notation, the receiver apparatus 10 may obtain received signal samples r1, r2, r3, and r4, corresponding to a symbol block of interest having symbols S1 (length=4 code), and symbols S2 and S3 (length=2 code).

The illustrated method includes computing first modified signal samples and modified dependence coefficients using said dependence coefficients and said received signal samples (Block 250). For example, the first modified signal samples are formed as the R values described earlier herein, and the modified dependence coefficients are formed as the Q' values obtained from the Q values.

Processing continues with, for each possible combination of all except at least one symbol in the group of symbols, subtracting from said first modified signal samples the dependence on said combination of symbols as described by said modified dependence coefficients in order to obtain second modified signal samples dependent principally on the remaining at least one symbol (Block 252). As one example of obtaining second modified signal samples, one may refer to the processing represented in Eq. (2).

Processing continues with determining unquantized values for said remaining at least one symbol from said second modified signal samples (Block 254). See, for example, the discussion immediately below Eq. (3) for an illustration of an unquantized value derived in accordance with one embodiment of this processing operation. Correspondingly, processing continues with quantizing each of the unquantized remaining at least one symbol to the nearest symbol value in the symbol alphabet to obtain quantized values for said at least one remaining symbol, and associating the quantized symbol values with the combination of other symbols to obtain a candidate symbol group (Block 256). It also is possible to go directly from the second modified samples to quantized values. Thus, it should be understood that the illustrated processing may be modified to go from the second modified values to the quantized values, without necessarily obtaining unquantized values.

Still further, the illustrated processing continues with, for each candidate symbol group, computing a metric that describes how well the candidate symbol group explains said set of received signal samples, and selecting the candidate group giving the best metric (Block 258). Here, selecting the candidate group giving the best metric represents the decoded symbols for the at least one remaining symbol. It should be understood that the other symbols in the group can be decoded by repeating these processing operations with those other symbols individually or collectively being considered "the at least one remaining symbol."

Thus, the teachings herein present a method for decoding a group of symbols from a set of received signal samples that depend on each symbol of the group to an extent depending on an associated dependence coefficient. In at least one embodiment, the method comprises, for each selected subset of symbols to be decoded from a group of symbols, forming hypothesized subsets representing different combinations of possible symbol values for those remaining symbols in the group not included in the selected subset. The method continues with, for each hypothesized subset, generating an estimate of the symbols in the selected subset. The method further continues with forming candidate symbol sets from the hypothesized subsets and the corresponding estimates. Each candidate symbol set thus represents a different combination of possible symbol values for the group of symbols. The method further continues with computing a metric for each candidate symbol set, the value of which indicates how well the candidate symbol set corresponds to the received signal samples, and outputting as decoded symbols the estimate of the symbols in the selected subset that corresponds to the candidate symbol set having a best one of the metrics. Here, "best" indicates closest matching or the like, and may be detected from the largest or smallest metric (e.g., magnitude evaluation) depending on whether the metric represents a maximization or minimization function.

Yet another formulation of the invention will now be presented in which equations are formulated with all-real quantities. It was already shown above how one optimum solution in the face of correlated noise is first to modify the equation $[Q](S)=R$ by multiplying both sides by $[D]$, the square root of the inverse correlation matrix to obtain $$[Q'](S)=(R') \qquad \text{Eq. (7)}$$

where $[Q']=[D][Q]$ and $(R')=[D](R)$. In Eq. (7), all quantities are complex, but when the symbols are for example M-ary QAM symbols, they can be partitioned into real and imaginary parts that each depend on a subset of the constituent bits. This is not necessarily true for all modulations, or even all M-QAM constellations, but is true at least when M is an even power of two, such as 16 or 64. We can thus define A1 to be the real, 2-bit part of complex symbol S1 and A2 to be the imaginary 2-bit part. Likewise let A3+jA4=S2, A5+jA6=S3, and so forth.

In terms of the 2-bit A's, Eq. (7) (for the 3×3 case) can be written as $$\begin{bmatrix} QR11 & -QI11 & QR12 & -QI12 & QR13 & -QI13 \\ QI11 & QR11 & QI12 & QR12 & QI13 & QR13 \\ QR21 & -QI21 & QR22 & -QI22 & QR23 & -QI23 \\ QI21 & QR21 & QI22 & QR22 & QI23 & QR23 \\ QR31 & -QI31 & QR32 & -QI32 & QR33 & -QI33 \\ QI31 & QR31 & QI32 & QR32 & QI33 & QR33 \end{bmatrix} = \qquad \text{Eq. (8)}$$

$$\begin{pmatrix} A1 \\ A2 \\ A3 \\ A4 \\ A5 \\ A6 \end{pmatrix} = \begin{pmatrix} RR1 \\ RI1 \\ RR2 \\ RI2 \\ RR3 \\ RI3 \end{pmatrix},$$

where QR, QI refer to real and imaginary parts respectively of a Q-element, and RR, RI refer respectively to real and imaginary parts of the signal values R. It shall also be understood that the Q and R values are the primed values if the option of pre-multiplying by the decorrelation matrix D has been employed, or not primed otherwise.

Now Eq. (8) represents six equations for the same number of variables, but as already stated, a direct solution by matrix inversion is not necessarily a good solution. In fact, the direct solution erases the effect of multiplying both sides by D, so no benefit of noise decorrelation would be obtained in that case. However, if we hypothesize just one of the A's, and remove its effect to the RHS, we are left with six equations in just five remaining A-'s, which is now an over-dimensioned problem, to which a least squares solution exists. Once that least squares solution has been found, the resulting "soft" A-values are quantized to the nearest 2-bit value, and associated with the originally hypothesized A-value. The entire set of 12 bits is then stored as one candidate solution. Four candidates are produced by this means, for all values of the originally hypothesized A-value, and then tested to see which best fulfills Eq. (7). It can now be seen that any number n of the A-values can be hypothesized, n=1 to 5, and the remaining 6−n are then found by quantizing the least squares solution for the remaining A-values.

When n A-values are hypothesized and their contributions removed to the RHS of Eq. (8), the remaining matrix is reduced in dimension to 6×(6−n). Denoting this diminished matrix by [Qdim] and the modified RHS by (R") and the remaining symbols by (Adim), we have to solve $$[Q\text{dim}](A\text{dim}) = (R''),  \quad \text{Eq. (9)}$$

for the least squares solution. By standard linear algebra, the solution is known to be: $(A\text{dim}) = [Q^T\text{dim} \cdot Q\text{dim}]^{-1}[Q^T](R'')$. This solution to Adim is then quantized to two bits element by element and stored together with the n originally hypothesized A values as a candidate solution, and a metric computed for it describing how well it satisfies original Eq. (8). The candidate having the best metric, i.e., the lowest residual sum-square error in satisfying the equations represented in Eq. (8), is then selected as the set of 12 decoded bits.

It can be mentioned that, in a multicode system in which not all codes are allocated to a receiver, and one code remains idle or is modulated with known data such as a pilot code used for channel estimation, it can still be useful to perform and utilize correlations with the unused code. Although the matrix of dependence coefficients Q will contain zeros in the equation describing dependence on the wanted symbols of the correlation with the extra code or codes, these zeros become non-zero values when the matrix is multiplied by the decorrelating matrix D. Thus it may still be useful to utilize signal samples or correlations that give no clue about the wanted symbols, because they instead may give a clue about the noise that affects the wanted symbols.

The above formulation may be able to be used for other modulations, providing their real and imaginary parts can be described in terms of a linear combination of bits with suitable coefficients. In finding such a description, the assignment of bit patterns to constellation points may be chosen arbitrarily for the purposes of deciding which symbols were received, as long as the symbols thereafter are assigned the true bit patterns as intended by the transmitter.

We have thus shown how the effort in decoding a multicode symbol, or other type of symbol block of two or more symbols, may be reduced by at least a factor equal to the size of the symbol alphabet, which would be an even greater saving with larger alphabets such as 64QAM. The equations may be arranged and computed in various ways by a person skilled in the art. As such, it should be understood that the foregoing description and the accompanying drawings represent non-limiting examples of the teachings presented herein and do not limit the present invention. Instead, the present invention is limited only by the following claims and their legal equivalents.

What is claimed is:

1. A method for decoding a group of symbols from a set of received signal samples that depend on each symbol of the group to an extent depending on an associated dependence coefficient, comprising:
   computing first modified signal samples using said received signal samples;
   for each possible combination of all except at least one symbol in said group of symbols, subtracting from said first modified signal samples a dependence on said combination of symbols, as described by said associated dependence coefficients;
   determining a value for the remaining at least one symbol that is the nearest symbol value in the symbol alphabet, to obtain a quantized value for said at least one remaining symbol; and
   associating the quantized symbol value with the combination of other symbols to obtain a candidate symbol group; and
   for each candidate symbol group, computing a metric that indicates how well the candidate symbol group corresponds to said set of received signal samples; and
   selecting the candidate symbol group having a best one of said metrics.

2. The method of claim 1, wherein subtracting from said first modified signal samples the dependence on said combination of symbols comprises obtaining second modified signal samples dependent principally on the remaining at least one symbol.

3. The method of claim 1, wherein said received signal samples are obtained by sampling a baseband signal corresponding to one of a GSM/EDGE signal and a LTE signal.

4. The method of claim 1, wherein said symbol alphabet is a 16QAM alphabet, and wherein said at least one symbol is a 16QAM symbol.

5. The method of claim 1, wherein said symbols are binary bits, and wherein said combination of all except at least one symbol means a selected sub-group of said binary bits.

6. The method of claim 4, wherein said selected sub-group of binary bits comprises all bits of one or more multi-bit symbols.

7. The method of claim 1, wherein determining a value for the remaining at least one symbol comprises separately quantizing the real part of an unquantized symbol value and the imaginary part of said unquantized symbol value.

8. The method of claim 1, wherein computing a metric is simplified by precomputing for all combinations of said all except at least one symbol in said symbol group look-up tables that depend on either the real parts or the imaginary parts of said all except the at least one symbol.

9. The method of claim 1, wherein computing first modified signal samples comprises correlation of said received signal samples with a number of CDMA codes.

10. The method of claim 1, wherein computing first modified signal samples comprises matrix multiplication of said received signal samples by the square root of the inverse of a noise correlation matrix.

11. The method of claim 1, wherein said associated dependence coefficients comprise modified dependence coefficients computed based on matrix multiplication by the square root of the inverse of a noise correlation matrix.

12. The method of claim 1, wherein said received signal samples comprise samples of signals received using two or more antennas.

13. The method of claim 1, wherein said associated dependence coefficients comprise modified dependence coefficients that are pre-computed once for all said possible combinations, and wherein subtracting from said first modified signal samples the dependence on said combination of symbols comprises subtracting from a combined signal value the dependence on said combination of symbols as described by said modified dependence coefficients.

14. A receiver apparatus for decoding a group of symbols from a set of received signal samples that depend on each symbol of the group to an extent depending on an associated dependence coefficient, said receiver apparatus comprising one or more processing circuits configured to:
   compute first modified signal samples said received signal samples;
   for each possible combination of all except at least one symbol in said group of symbols: subtract from said first modified signal samples a dependence on said combination of symbols, as described by said associated dependence coefficients;
      determine a value for the remaining at least one symbol that is the nearest symbol value in the symbol alphabet, to obtain a quantized value for said at least one remaining symbol; and
      associate the quantized symbol value with the combination of other symbols to obtain a candidate symbol group; and
   for each candidate symbol group, compute a metric that indicates how well the candidate symbol group corresponds to said set of received signal samples; and
   select the candidate symbol group having a best one of said metrics.

15. The receiver apparatus of claim 14, wherein the receiver apparatus is configured to subtract from said first modified signal samples the dependence on said combination of symbols in order to obtain second modified signal samples dependent principally on the remaining at least one symbol.

16. The receiver apparatus of claim 14, wherein the receiver apparatus is configured to obtain said received signal samples by processing one of a GSM/EDGE signal and an LTE signal.

17. The receiver apparatus of claim 14, wherein said symbol alphabet is a 16QAM alphabet and said at least one symbol is a 16QAM symbol.

18. The receiver apparatus of claim 14, wherein said symbols are binary bits, and wherein said combination of all except at least one symbol means a selected sub-group of said binary bits.

19. The receiver apparatus of claim 17, wherein said selected sub-group of binary bits comprises all bits of one or more multi-bit symbols.

20. The receiver apparatus of claim 14, wherein the receiver apparatus is configured to determine a value for the remaining at least one symbol by separately quantizing the real part of an unquantized symbol value and the imaginary part of said unquantized symbol value.

21. The receiver apparatus of claim 14, wherein the receiver apparatus is configured to simplify computing a metric by precomputing for all combinations of said all except at least one symbol in said symbol group look-up tables that depend on either the real parts or the imaginary parts of said all except the at least one symbol.

22. The receiver apparatus of claim 14, wherein the receiver apparatus is configured to compute first modified signal samples by correlating said received signal samples with a number of CDMA codes.

23. The receiver apparatus of claim 14, wherein the receiver apparatus is configured to compute first modified signal samples by matrix multiplication of said received signal samples by the square root of the inverse of a noise correlation matrix.

24. The receiver apparatus of claim 14, wherein said associated dependence coefficients comprise modified dependence coefficients computed based on matrix multiplication by the square root of the inverse of a noise correlation matrix.

25. The receiver apparatus of claim 14, wherein said circuit for computing first modified signal samples and modified dependence coefficients comprises one of a block decision feedback equalizer and a block linear equalizer.

26. A method for decoding a group of symbols from a set of received signal samples that depend on each symbol of the group to an extent depending on an associated dependence coefficient comprising, for each selected subset of symbols to be decoded from the group:
   forming hypothesized subsets representing different combinations of possible symbol values for those remaining symbols in the group not included in the selected subset;
   for each hypothesized subset, generating an estimate of the symbols in the selected subset;
   forming candidate symbol sets from the hypothesized subsets and the corresponding estimates, each candidate symbol set thus representing a different combination of possible symbol values for the group of symbols;
   computing a metric for each candidate symbol set, the value of which indicates how well the candidate symbol set corresponds to the received signal samples; and
   outputting as decoded symbols the estimate of the symbols in the selected subset that corresponds to the candidate symbol set having a best one of the metrics.

27. The receiver apparatus of claim 14, wherein said associated dependence coefficients comprise modified dependence coefficients that are pre-computed once for all said possible combinations, and wherein the one or more processing circuits are configured to subtract from said first modified signal samples the dependence on said combination of symbols by subtracting from a combined signal value the dependence on said combination of symbols as described by said modified dependence coefficients.

* * * * *